(12) United States Patent
Araki

(10) Patent No.: US 9,013,724 B2
(45) Date of Patent: Apr. 21, 2015

(54) INFORMATION PROCESSING APPARATUS AND PROGRAM

(75) Inventor: Shigeo Araki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 162 days.

(21) Appl. No.: 13/591,832

(22) Filed: Aug. 22, 2012

(65) Prior Publication Data

US 2013/0063746 A1    Mar. 14, 2013

(30) Foreign Application Priority Data

Sep. 14, 2011  (JP) ................................ 2011-200838

(51) Int. Cl.
*G06K 15/02*    (2006.01)
*G06F 3/12*    (2006.01)

(52) U.S. Cl.
CPC ............ *G06F 3/1204* (2013.01); *G06F 3/1205* (2013.01); *G06F 3/1254* (2013.01); *G06F 3/1257* (2013.01)

(58) Field of Classification Search
USPC ............ 358/1.13, 1.15, 1.9; 710/10; 717/173, 717/178; 719/321, 327
See application file for complete search history.

(56) References Cited

U.S. PATENT DOCUMENTS

| 7,088,462 | B2 * | 8/2006 | Bhogal et al. ................. 358/1.15 |
| 2005/0146731 | A1 * | 7/2005 | Mitani ............................ 358/1.1 |
| 2006/0170947 | A1 * | 8/2006 | Kurabayashi ................. 358/1.13 |
| 2006/0221372 | A1 * | 10/2006 | Onishi et al. .................. 358/1.13 |
| 2007/0245358 | A1 * | 10/2007 | Hattori et al. .................. 719/321 |
| 2008/0204798 | A1 * | 8/2008 | Taniguchi et al. ........... 358/1.15 |
| 2010/0238494 | A1 | 9/2010 | Araki |
| 2010/0318984 | A1 | 12/2010 | Araki |
| 2011/0058205 | A1 | 3/2011 | Araki |

FOREIGN PATENT DOCUMENTS

| JP | 2006-309726 | 11/2006 |
| JP | 2010-271937 | 12/2010 |

* cited by examiner

*Primary Examiner* — Allen H Nguyen
(74) *Attorney, Agent, or Firm* — Harness, Dickey & Pierce, P.L.C.

(57) ABSTRACT

An information processing apparatus is disclosed, including: a first storage unit which stores printing setting information used in an OS, the printing setting information including identifying information and a setting value of each setting item in printing; a second storage unit which stores customizing information including identifying information and a default value of a predetermined setting item that is included in a printer driver; and an updating unit which updates a setting value of the printing setting information to the default value and identifying information of the printing setting information to identifying information of the customizing information when the identifying information included in the printing setting information and the identifying information stored in the second storage unit differ when the printing setting information read by the OS from the first storage unit is obtained.

13 Claims, 16 Drawing Sheets

FIG.7

PRINTING SETTING INFORMATION

CustomID:"custom1"
color_settings:color
duplex_settings:none
layout_settings:6in1

{ "CustomID" : "custom0",
  "Default"
  {}
}

FIG.9

{ "CustomID" : "custom2",
  "Default"
  { "color_settings" : "blackandwhite",
    "duplex_settings":"opentotop"}
}

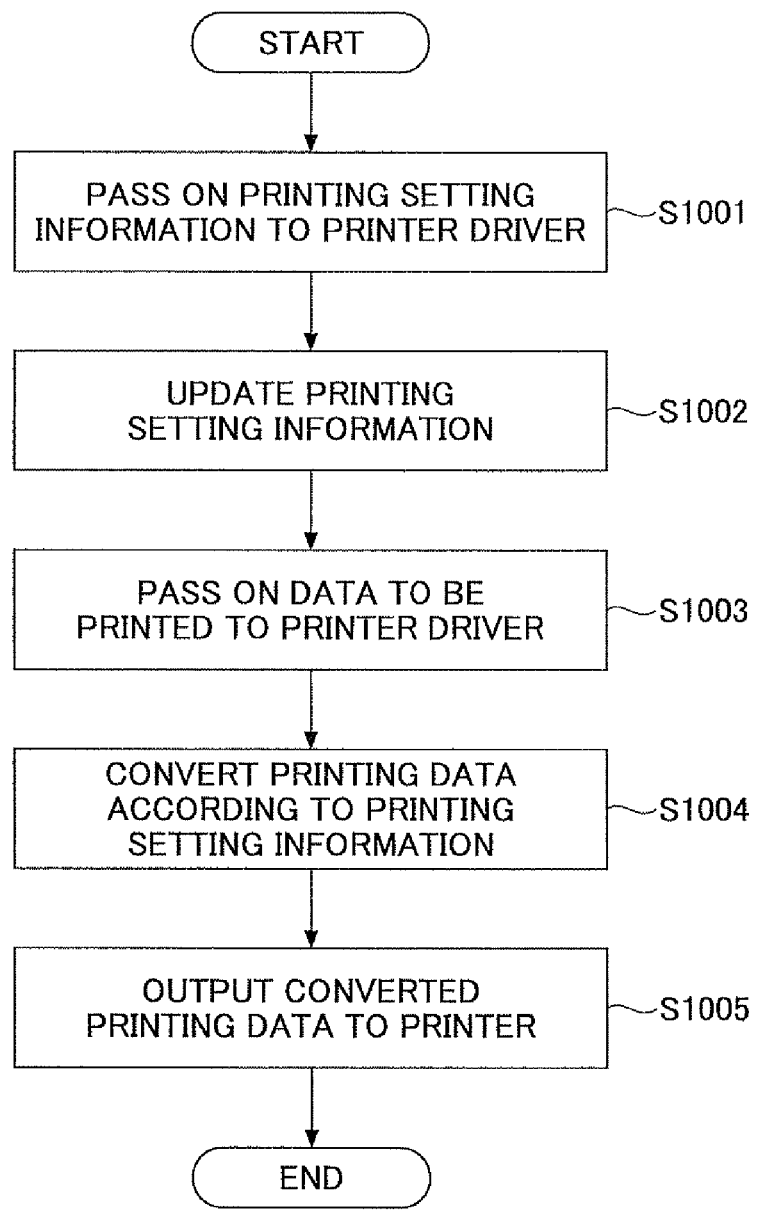

INFORMATION PROCESSING APPARATUS AND PROGRAM

TECHNICAL FIELD

The present invention relates to information processing apparatuses and programs which control printing according to printing setting.

BACKGROUND ART

Up to now, there has been a demand for customizing a printer driver depending on the environment of a printing system. For such a demand, a technique is known which customizes the printer driver.

For example, in Patent Document 1 is disclosed a technique that issues identifying information for specifying a customizing driver which is customized and that associates the issued identifying information with the customizing driver to store the associated result.

In recent years, there has been a printer driver which holds, as customizing information, a default value of a setting value included in printing setting information. Moreover, an OS (operating system) and a predetermined application have default printing setting information generated based on printing setting information which the printer driver has.

Here, in the related art, the default printing setting information held by the OS or the printing setting information held by the application is not updated using the customizing information of the printer driver when the printer driver is updated.

In other words, there is a problem that, even when the customizing information is updated at the time of updating the printer driver to update the default value of the printing setting information of the printer driver, it is not reflected in the default printing setting information held by the OS or a predetermined application.

The possible reason for the problem occurring is as follows: The printing setting information held by the application may not be updated from the printer driver. Moreover, it is difficult to update the printing setting information held by the OS from the printer driver.

Moreover, an interface of the printer driver that is DryConvertDevmode for updating the printing setting of the OS is only called by the OS when a version of DEVMODE changes or the structure itself changes. Therefore, it is necessary to update all of the binary files of the printer driver handling the DEVMODE. For example, it may not be used in a scenario in which a customer updates customizing information to perform an update installation.

Moreover, in order to reflect the customizing information of the printer driver into printing setting information held by the OS and the application, there is a method to uninstall and reinstall the printer driver. However, when there is a huge number of client PCs in a server client environment, it is not realistic to uninstall and reinstall the printer driver of each client PC.

Patent Document

Patent Document 1 JP2006-309726A

DISCLOSURE OF THE INVENTION

In light of the problems described above, an object of the present invention is to provide an information processing apparatus and a program which customizes a default value of printing setting information at a time of updating the printer driver and reflect the default value customized to the printing setting information held by the OS.

According to an embodiment of the present invention, an information processing apparatus is provided, including a first storage unit which stores printing setting information used in an OS, the printing setting information including identifying information and a setting value of each setting item in printing; a second storage unit which stores customizing information including identifying information and a default value of a predetermined setting item that is included in a printer driver; and an updating unit which updates a setting value of the printing setting information to the default value and identifying information of the printing setting information to identifying information of the customizing information when the identifying information included in the printing setting information and the identifying information stored in the second storage unit differ when the printing setting information read by the OS from the first storage unit is obtained.

The present invention makes it possible to customize a default value of printing setting information at a time of updating a printer driver and to reflect the customized default value to the printing setting information held by the OS.

BRIEF DESCRIPTION OF THE DRAWINGS

Other objects, features, and advantages of the present invention will become more apparent from the following detailed descriptions when read in conjunction with the accompanying drawings, in which:

FIG. 7 is a diagram showing exemplary printing setting information;

FIG. 8 is a diagram showing an example of a first part of customizing information;

FIG. 9 is a diagram showing an example of a second part of the customizing information;

FIG. 20 is a flowchart showing an exemplary process at a time of printing.

BEST MODE FOR CARRYING OUT THE INVENTION

Below embodiments of the present invention are described in detail with reference to drawings.

Embodiment 1

System

Figure 1:
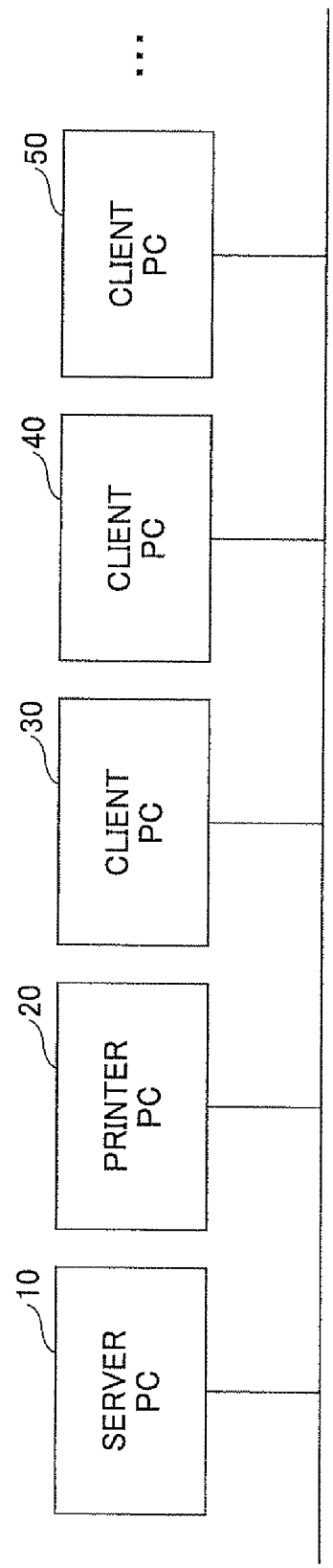
FIG. 1 is a diagram which shows an example of a printing system according to an embodiment 1.

FIG. 1 is a diagram which shows an example of a printing system according to an embodiment 1. A printing system 1 shown in FIG. 1 includes a server PC (Personal Computer) 10, a printer 20; and multiple client PCs 30, 40, and 50. The server PC 10 and the client PCs 30, 40, and 50 are information processing apparatuses, for example.

There are two forms of using a printer driver, for example. One is a case such that, after the printer driver is installed in the server PC 10, it is copied to the client PCs 30, 40, and 50, and used on each of the client PCs. Another is a case such that it is installed as it is into a PC to be used in a standalone environment. In the embodiment 1, a server client environment is used as what is to be described.

Hardware

Figure 2:
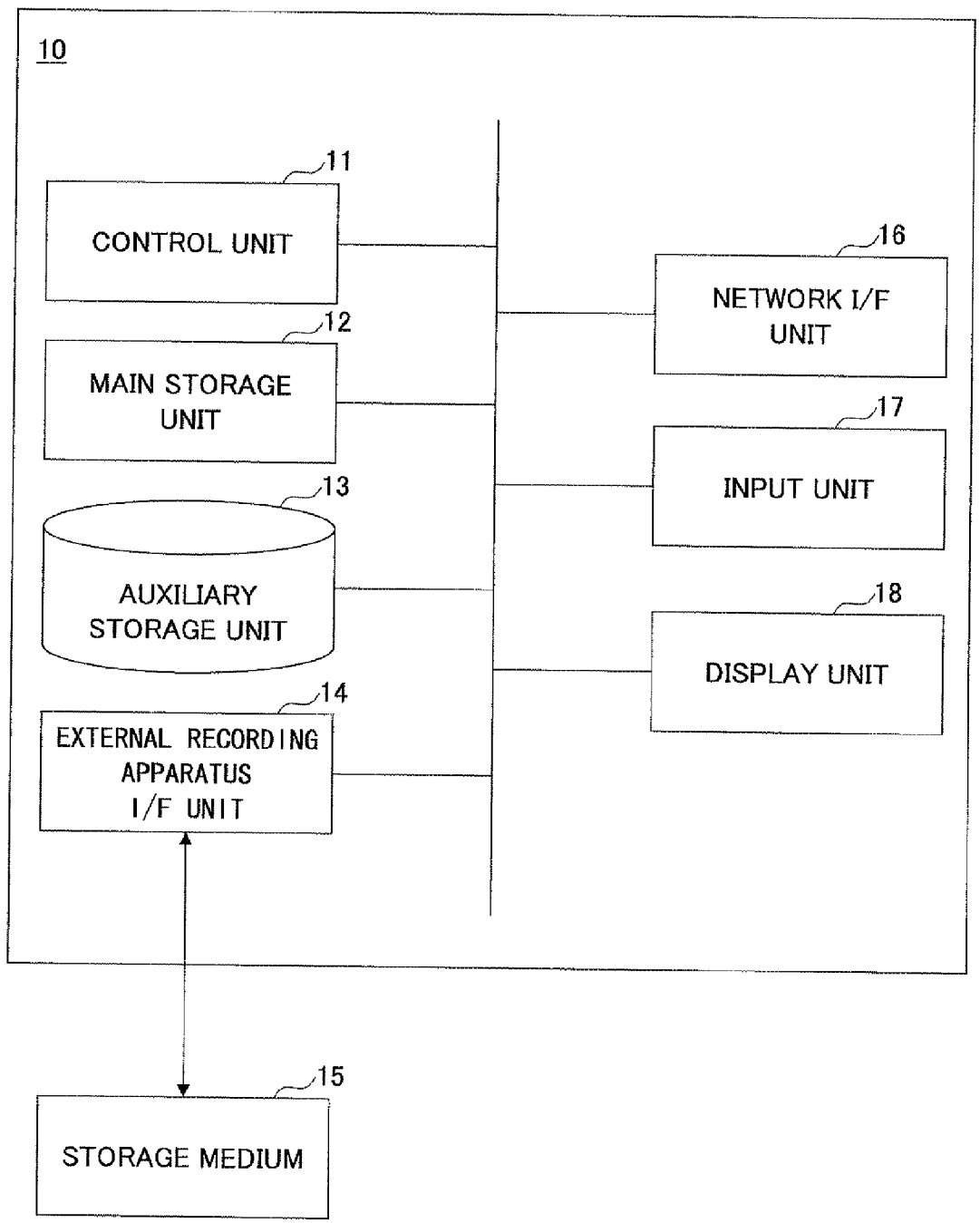
FIG. 2 is a diagram which shows an example of hardware of a server PC according to the embodiment 1.

FIG. 2 is a block diagram which shows an example of hardware of the server PC 10 according to the embodiment 1. As shown in FIG. 2, the server PC 10 includes a controller 11, a main storage unit 12, an auxiliary storage unit 13, an external recording apparatus I/F unit 14, a network I/F unit 16, an input unit 17, and a display unit 18. These respective elements are mutually connected via a bus such that data can be transmitted and received therebetween.

The control unit 11 is a CPU which performs operation and processing on the data and which control the respective apparatuses. Moreover, the control unit 11, which is an operating apparatus which executes a program stored in the main storage unit 12, receives data from an input apparatus and a storage apparatus, performs operation and processing on the data, and outputs the results of the operation and processing to an output apparatus and the storage apparatus.

The main storage unit 12, which may be a ROM (Read-Only Memory), a RAM (Random Access Memory), is a storage apparatus which stores or temporarily saves the data and programs such as application software and an OS, which is basic software to be executed by the control unit 11.

The auxiliary storage unit 13, which may be an HDD (Hard Disk Drive), etc., stores data related to application software, etc.

The external recording apparatus I/F unit 14 is an interface between the server PC 10 and a recording medium 15 (for example, a flash memory), which is connected via a data transmission path, such as a USB (Universal Serial Bus).

Moreover, the recording medium 15 stores predetermined programs, which programs stored in the recording medium 15 are installed in the server PC 10 via the external recording apparatus I/F unit 14, and the predetermined programs installed can be executed by the server PC 10.

The network I/F unit 16 is an interface between the server PC 10 and a peripheral equipment unit with a communications function that is connected via a network. The network includes a WAN (wide area network), a LAN (local area network) which is built with a data transmission path such as a wired and/or wireless circuit, etc.

The input unit 17 includes a slice pad and a mouse for performing a key selection, etc., on a display screen of the display unit 18, and a keyboard which includes a cursor key, a numerical input, various functional keys, etc. Moreover, the input unit 17 is a user interface for the user to provide operating instructions to the control unit 11 and to input data.

For the display unit 18, which includes a CRT (cathode ray tube), a LCD (a liquid crystal display), etc., a display is made according to display data input from the control unit 11. For the server PC 10, neither the input unit 17 nor the display unit 18 are necessarily elements.

Moreover, the client PCs 30, 40, and 50 include the same hardware as the server PC 10, so that the explanations thereof are omitted.

Configuration

Figure 3:
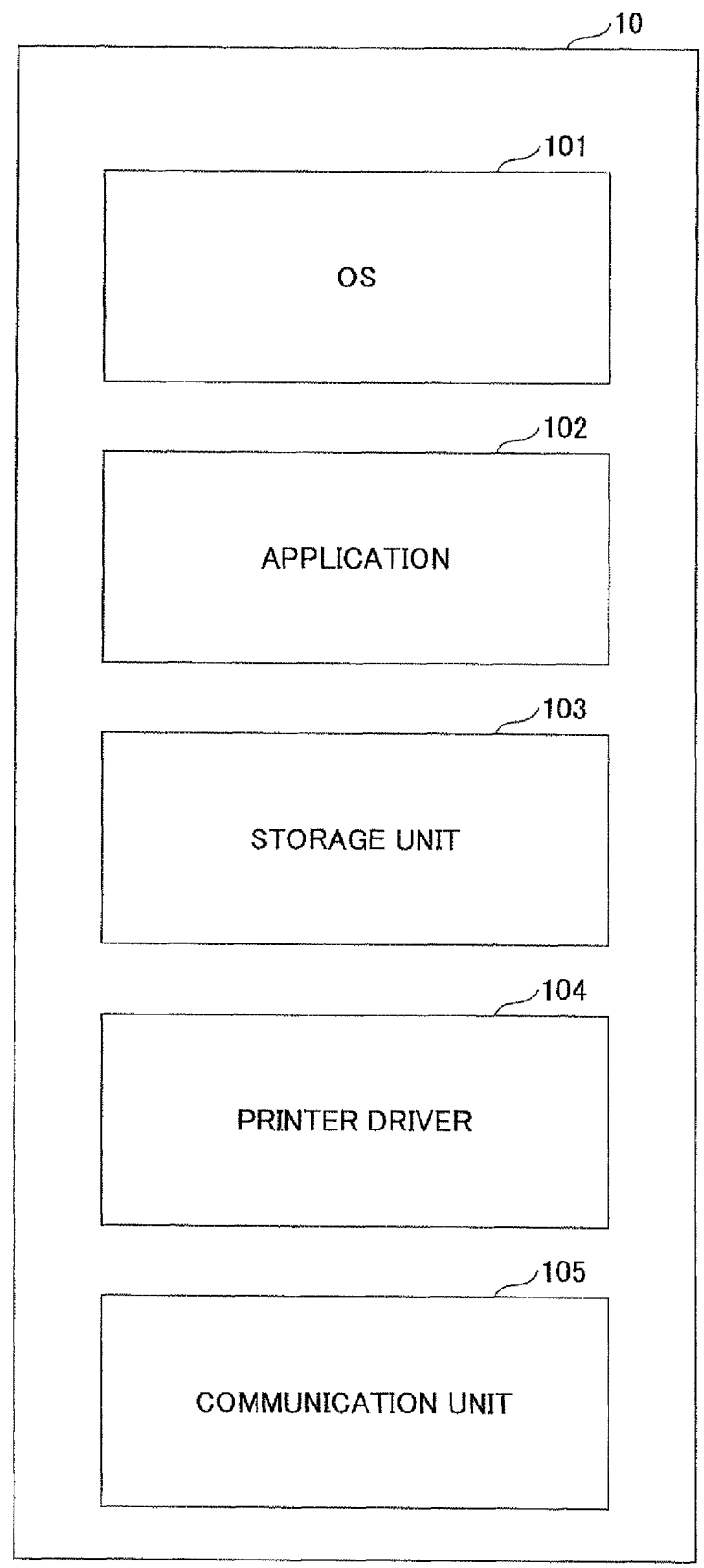
FIG. 3 is a diagram which shows an exemplary configuration of the server PC according to the embodiment 1.

FIG. 3 is a block diagram which shows an exemplary configuration of the server PC 10 according to the embodiment 1. The client PCs 30, 40, and 50 also have the same configuration, so that a configuration of the server PC 10 is described.

The server PC 10, which is shown in FIG. 3, includes an OS (operating system) 101, an application 102, a storage unit 103, a printer driver 104, and a communication unit 105.

The OS 101 can save into or read from the storage unit 103 printing setting information including a setting value of each setting item related to printing of the printer 20. The OS 101 outputs the printing setting information setting information obtained from the storage unit 103. Moreover, the OS 101 outputs the printing setting information to the printer driver 104 when the printing setting information is obtained from the application 102. Moreover, when data to be printed is obtained from the application 102, the OS 101 outputs the data to the printer driver 104.

The application 102 outputs data to be printed, without itself generating printing data to the printer 20. Then, when holding the printing setting information, the application 102 outputs the printing setting information to the OS 101.

The storage unit 103 stores the printing setting information written from the printer driver 104 or the OS 101. The storage unit 103 is a registry, for example. Details of the storage unit 103 are described below.

When data to be printed are obtained from the OS 101, the printer driver 104 changes the data to a printing instruction which can be interpreted. The printer driver 104 transmits the printing instruction to the printer 20 via the communication unit 105. Here, when a setting value included in the printing setting information is to be customized, customizing information having a customized default value is updated.

The communication unit 105 transmits the data to and receives data from the printer 20. For example, the communications unit 105 transmits a printing instruction obtained from the printer driver 104 to the printer 20.

Application 102

Figure 4:
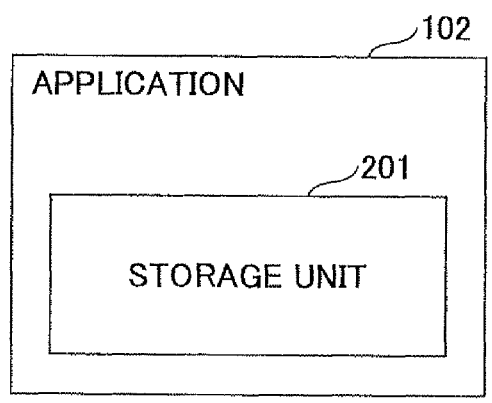
FIG. 4 is a block diagram showing an exemplary configuration of an application.

Next, a configuration of the application 102 is described. FIG. 4 is a block diagram showing an exemplary configuration of the application 102. The application 102 shown in FIG. 4 has a storage unit 201. The storage unit 201 stores printing setting information used in the application 102. The application 102 which holds the printing setting information includes Excel, for example. Excel may hold the printing setting information for each worksheet.

The application 102, which is shown in FIG. 4, causes the printer driver 104 to display a printing setting screen or perform printing based on the printing setting information held in the storage unit 201.

Printer Driver 104

Figure 5:
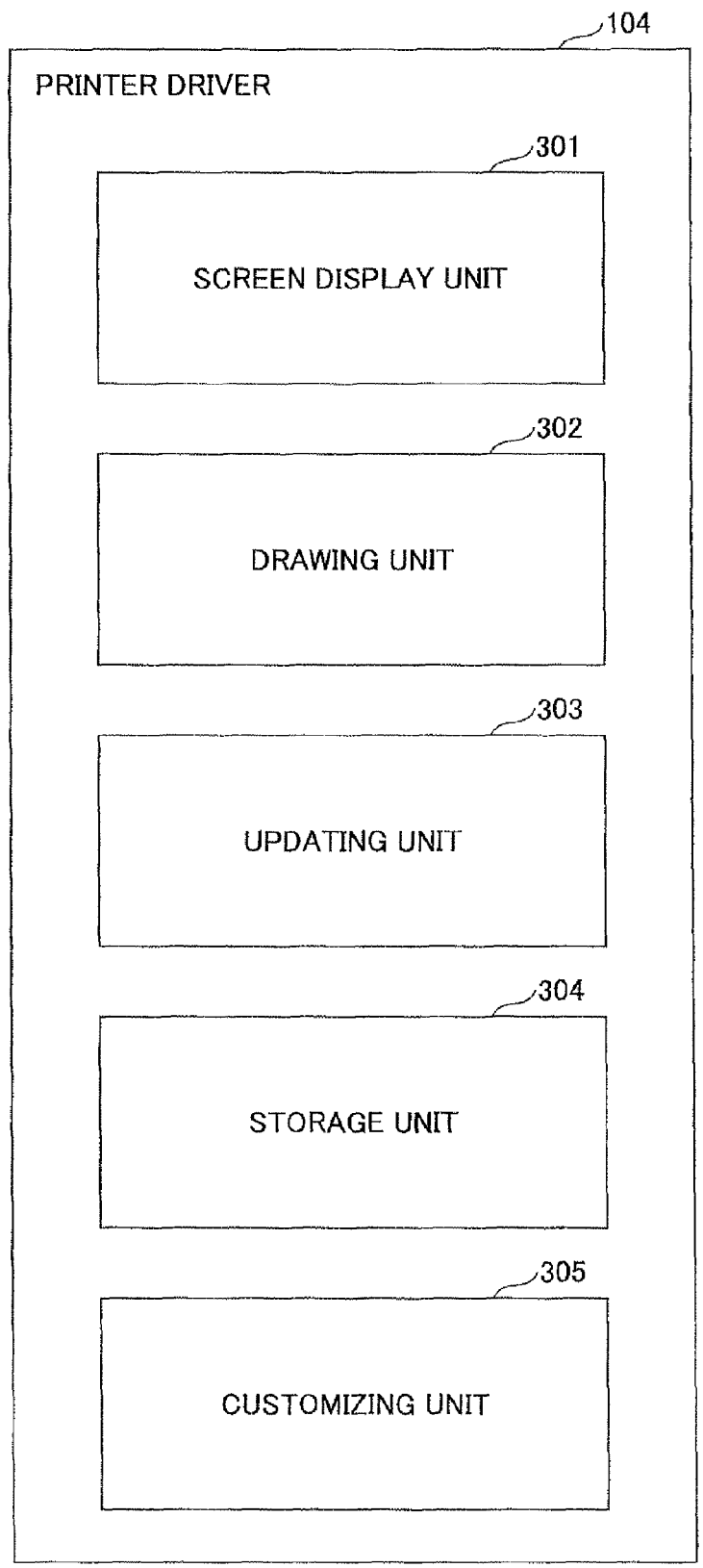
FIG. 5 is a block diagram showing an exemplary configuration of a printer driver.

Next, a configuration of the printer driver 104 is described. FIG. 5 is a block diagram showing an exemplary configuration of the printer driver 104. The printer driver 104, which is shown in FIG. 5, includes a screen display unit 301, a drawing unit 302, an updating unit 303, a storage unit 304, and a customizing unit 305.

The screen display unit 301 obtains printing setting information from the OS 101 or the application 102, and, when a request for displaying the printing setting screen is received, control is performed of displaying the printing setting screen generated based on printing setting information obtained.

The drawing unit 302 converts data to be printed for which printing is requested by the application 102 to a printing instruction which can be interpreted by the printer 20. The printing instruction is PDL (Page Description Language), for example.

When customizing information is updated by updating of the printer driver 104, the updating unit 303 updates the printing setting information with a default value defined by the customizing information. If necessary, the updating unit 303 uses a default value of updated customizing information to update printing setting information held by the OS 101 and the application 102.

For example, the updating unit 303 compares identifying information (below called Custom ID) included in the customizing information from the storage unit 304 or below-described storage unit 404 for printer driver with identifying information within the printing setting information held by the OS 101 or the application 102. The updating unit 303 determines that updating is not necessary when results of comparison are the same. Moreover, when these identifying information sets are different, the updating unit 303 determines that the updating is necessary. The updating unit 303 returns the updated printing setting information to the OS 101 and the application 102.

The storage unit 304 stores the customizing information. The customizing information includes identifying information (Custom ID) which identifies customizing contents and a default item in a predetermined setting item customized.

The customizing unit 305 obtains customizing information from the storage unit 304 or a below-described storage unit 404 for printer driver, and generates default printing setting information based on the identifying information (Custom ID) and the default value included in the customizing information. The customizing unit 305 outputs generating the printing setting information to the OS 101. The OS 101 writes the printing setting information to the storage unit 103.

Storage Unit 103

Figure 6:
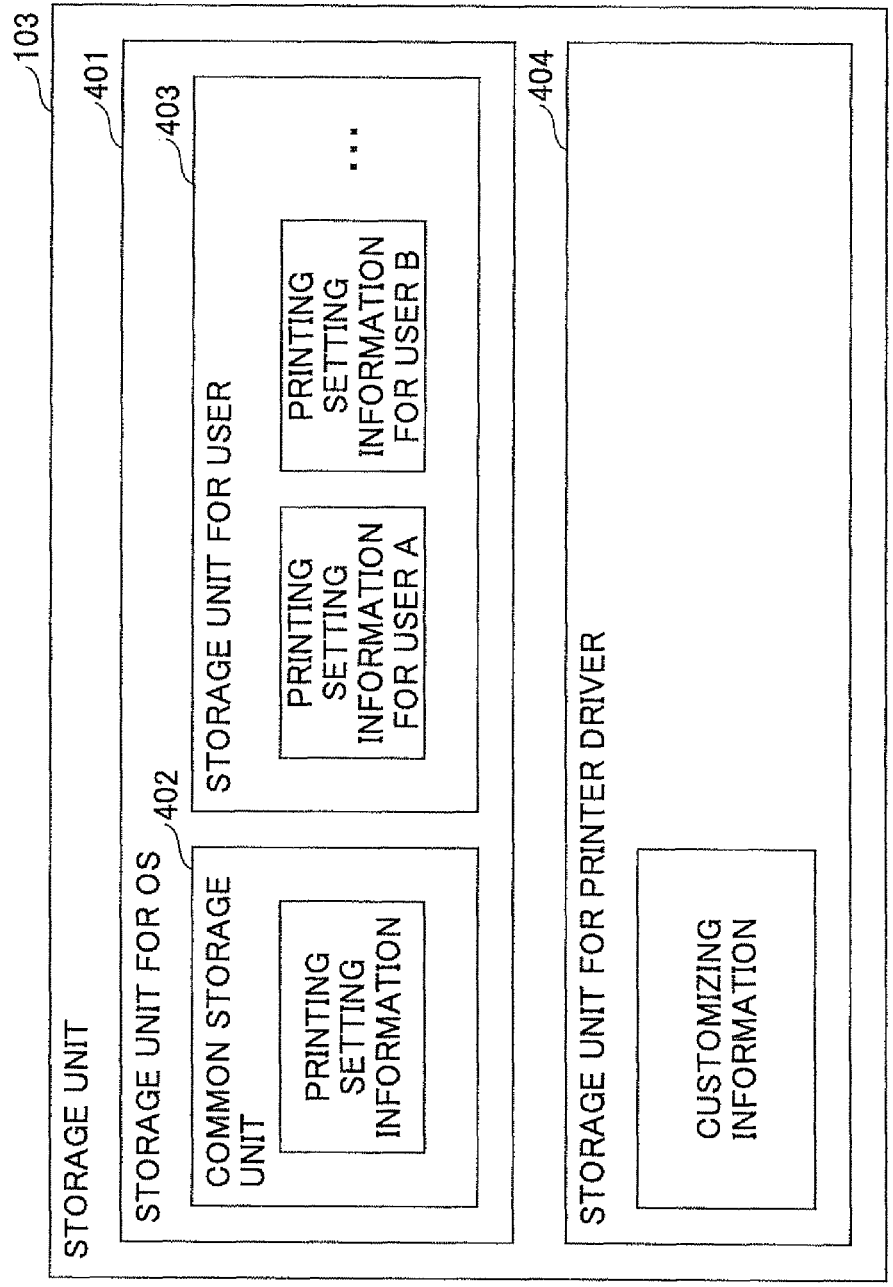
FIG. 6 is a diagram showing an example of each storage area of a storage unit.

Next, each storage area of the storage unit 103 is described. FIG. 6 is a diagram showing an example of each storage area of the storage unit 103. The storage unit 103 is divided into each storage area of the storage unit 401 for the OS and the storage unit 404 for the printer driver.

The storage unit 401 for the OS is a storage area which the OS 101 freely writes to and reads from. The printer driver 104 also may write to and read from the storage unit 401 for the OS, but timing and a privilege thereof are limited.

The storage unit 401 for the OS is divided into each storage area 403 for each user and the common storage unit 402. The common storage unit 402 stores default printing setting information used by the OS 101. The storage unit 403 for each user stores, for each user, printing setting information generated by copying printing setting information stored in the common storage unit 402. For example, the storage unit 403 for each user stores printing setting information of a user A, printing setting information of a user B, etc.

When printing setting information for each user is generated, printing setting information corresponding to a logged-in user is read from the storage unit 403 for each user, and, when a setting value is changed, the changed setting value is stored in the storage unit 403 for each user. For example, when the printing setting information of a user A is generated, writing or reading is done on the printing setting information of the user A that is stored into the storage unit 403 for each user.

The storage unit 404 for the printer driver stores customizing information. The customizing information is written by the printer driver 104 when the printer driver 104 is installed or updated.

The storage unit 404 for the printer driver is synchronized by the OS 101 between the server PC 10 and the client PCs 30, 40, and 50. Thus, when the storage unit 404 for the printer driver of the server PC 10 is updated, it is reflected into the storage unit for the printer driver of each client PC by the OS 101.

Data Structure

Next, data structure of each information set used by the information processing apparatus 10 is described. FIG. 7 is a diagram showing exemplary printing setting information. As shown in FIG. 7, printing setting information includes identifying information (Custom ID) which identifies customizing contents. In an example shown in FIG. 7, the Custom ID is "custom1".

In other words, the printing setting information shown in FIG. 7 shows that it is printing setting information generated when customizing corresponding to the "custom 1" is performed.

Moreover, printing setting information shown in FIG. 7 includes color settings (color_settings), duplex settings (duplex_settings), layout settings (layout_settings), etc., which are printing setting items. The printing setting information includes setting values of respective setting items.

Printing setting information shown in FIG. 7 is stored in the common storage unit 402, the storage unit 403 for each user, and a storage unit 201 of the application 102. The printing setting information for each storage unit is not necessarily the same. This is because each user or application may change a setting value included in the respective printing setting information sets.

FIG. 8 is a diagram showing an example of a first part of customizing information. The customizing information shown in FIG. 8 shows an example when it is realized in a JSON (Java Script (registered trademark) Object Notation). The customizing information includes identifying information (Custom ID) which identifies customizing contents and a default item in a setting item which is included in printing setting information, which is customizing contents.

An example shown in FIG. 8 is an example in which the Custom ID is "custom0" and customizing of the default value is not performed.

FIG. 9 is a diagram showing an example of a second part of the customizing information. In the customizing information shown in FIG. 9, the Custom ID is "custom2". Moreover, the default value is customized such that a color setting becomes "black and white" and a double-face setting becomes "opentop".

For example, when the printer driver including the customizing information shown in FIG. 9 is updated, the printing setting information (see FIG. 7, for example) stored in the common storage unit 402, etc., is updated by the updating unit 303. In this case, the double-face setting and the color setting of the printing setting information shown in FIG. 7 are respectively changed to "opentop" and "black and white", and the Custom ID is changed to "custom2".

When the printer driver is updated, the updating unit 303 changes a setting item included in the customizing information out of setting items of the printing setting information to the default value of the customizing information. The setting item not included in the customizing information out of setting items of the printing setting information may be left as it is or may be returned to a hard-coded default value.

When left as it is, a setting value changed by the respective users may be maintained, and, when changing back to the hard coded default value, the setting value changed by each user may be reset to the default value at one time.

Overview of Updating in a Client Server Environment

Figure 10:
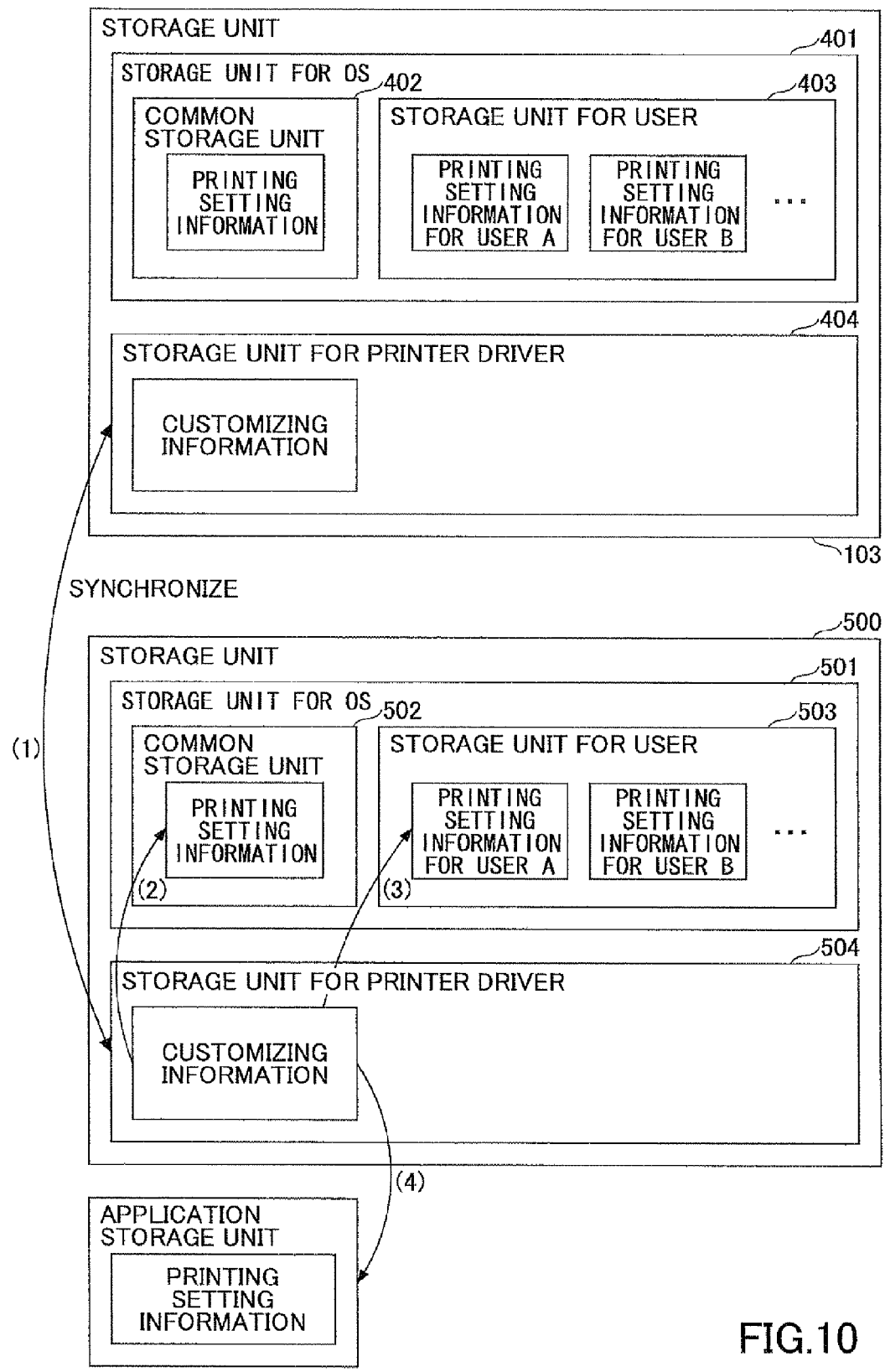
FIG. 10 is a diagram showing an overview of updating in a server client environment.

FIG. 10 is a diagram showing an overview of updating in a server client environment. In an example in FIG. 10, suppose that the printer driver of the server PC 10 is updated. Then, the customizing information stored in the storage unit 404 for the printer driver is updated.

Next, when the OS 101 detects that the customizing information stored in the storage unit 404 for the printer driver is updated, it synchronizes with the storage unit 504 for the printer driver of each client PC. In other words, the updated customizing information is stored into the storage unit 504 for the printer driver of each client PC.

Next, suppose that the printing setting information which is stored in the common storage unit 502 held by the OS is obtained to output the printing setting information to the printer driver and printing for the printing setting information is requested. Then, as the Custom ID within the printing setting information and the Custom ID within the customizing information differ, the updating unit of the printer driver performs an updating process. For example, a value of a setting item within the customizing information out of setting items of the printing setting information is updated to a default value within the customizing information.

Moreover, when the logged-in user A requests a printing setting screen, for example, the printing setting information of the user A is read from the OS, and the OS outputs printing setting information to the printing setting screen. Here, as the Custom ID within the printing setting information and the Custom ID within the customizing information differ, the updating unit of the printer driver performs the updating process.

Moreover, when the application requests a printing setting screen, for example, the printing setting information held by itself is output to the printer driver. Here, as the Custom ID within the printing setting information and the Custom ID within the customizing information differ, the updating unit of the printer driver performs the updating process.

This makes it possible to customize a default value of the printing setting information at the time of updating the printer driver and to reflect the customized default value to the printing setting information held by the OS and the application.

Operation

Next, an operation of each apparatus within the printing system is described.

Process of Installing a Printer Driver in a Server PC

Figure 11:
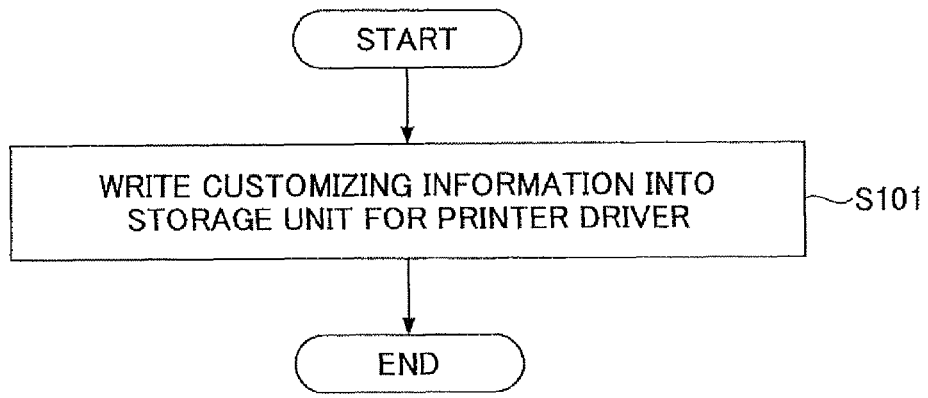
FIG. 11 is a flowchart showing an exemplary process executed when the printer driver is installed in the server PC.

FIG. 11 is a flowchart showing an exemplary process executed when the printer driver 104 is installed in the server PC 10.

In step S101, the printer driver 104 installed in the server PC 10 writes its own customizing information in the storage unit 404 for printer driver. In this way, it becomes ready to create the printing setting information used by an OS 101 of the server PC 10.

Process of Installing a Printer Driver in a Client PC

Figure 12:
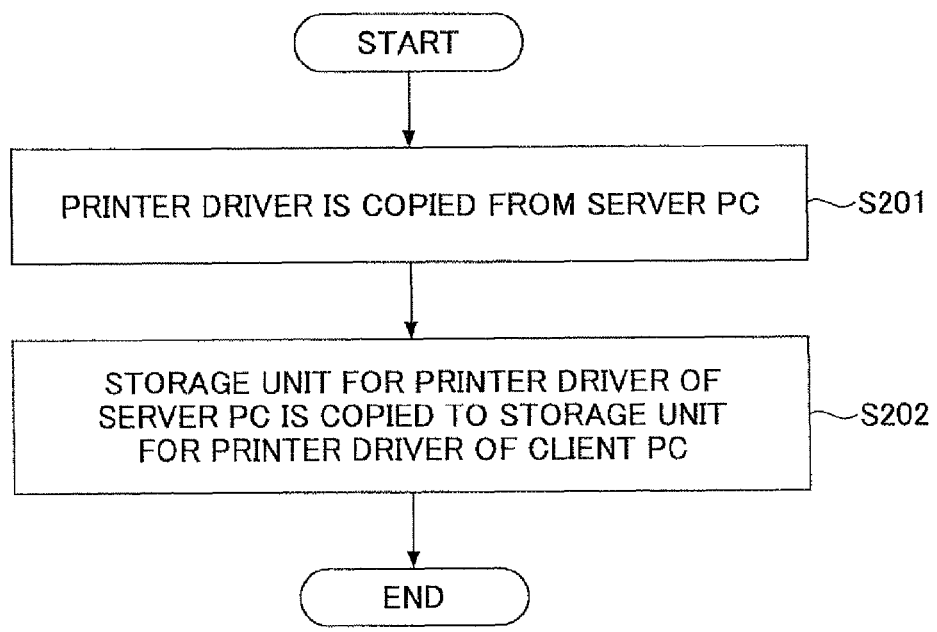
FIG. 12 is a flowchart showing an exemplary process executed when the printer driver is installed in a client PC.

FIG. 12 is a flowchart showing an exemplary process executed when the printer driver is installed into the client PC.

In step S201, with the OS 101 of the server PC 10, each module of the printer driver 104 of the server PC 10 is copied to each client PC.

In step S202, customizing information stored in the storage unit 404 for printer driver of the server PC 10 is copied to the storage unit for printer driver of the client PC. In this way, the same printer driver can be used in the client PC.

Process of Updating a Printer Driver in the Server PC

Figure 13:
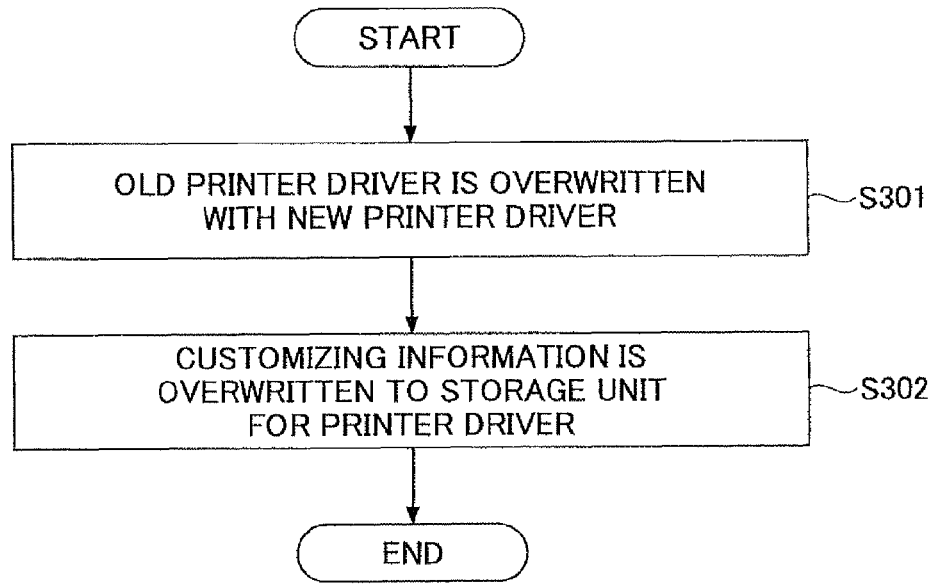
FIG. 13 is a flowchart showing an exemplary process executed when the printer driver is updated in the server PC.

FIG. 13 is a flowchart showing an exemplary process executed when the printer driver is updated in the server PC 10.

In step S301, an old printer driver is overwritten with a new printer driver.

In step S302, the new printer driver overwrites its own customizing information to the storage unit 404 for printer driver. In this way, the customizing information of the storage unit 404 for printer driver of the server PC 10 is updated.

Process of Updating a Printer Driver at the Client PC

Figure 14:
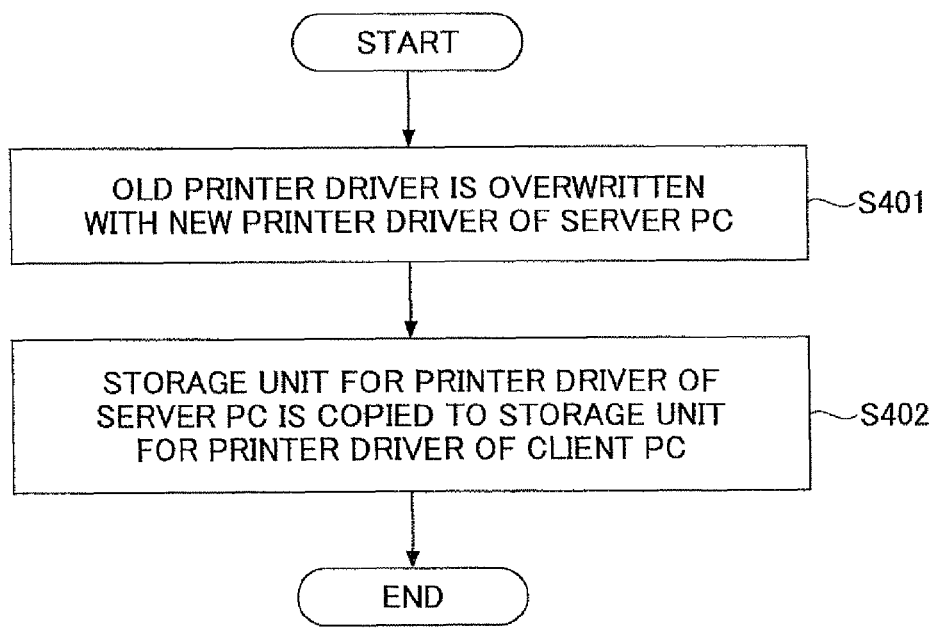
FIG. 14 is a flowchart showing an exemplary process executed when the printer driver is updated in the client PC.

FIG. 14 is a flowchart showing an exemplary process executed when the printer driver is updated in the client PC. The process shown in FIG. 14 is a process which is executed after the printer driver of the server PC 10 is updated.

In step S401, an old printer driver of each client PC is overwritten with a new printer driver of the server PC 10. In step S402, the customizing information stored in the storage unit 404 for printer driver of the server PC 10 is copied to the storage unit for printer driver of each client PC. In this way, the customizing information of the storage unit for printer driver of the client PC is updated.

A Process for the OS to Obtain a Default Printing Setting

Figure 15:
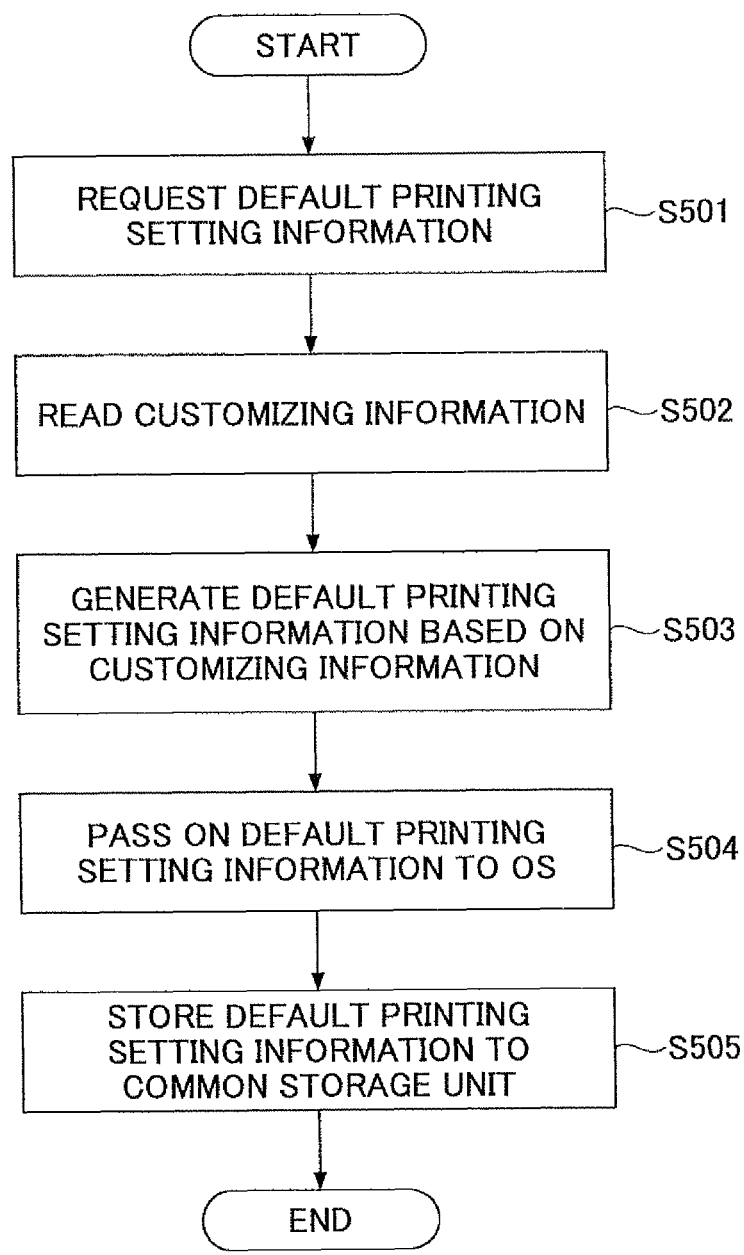
FIG. 15 is a flowchart showing an exemplary process for an OS to obtain a default printing setting.

FIG. 15 is a flowchart showing an exemplary process for an OS 101 to obtain a default printing setting. After the printer driver is installed, the OS 101 obtains a default value of the printer driver in order to create a common printing setting.

In step S501, the OS 101 requests the printer driver 104 default printing setting information.

In step S502, the customizing unit 305 reads customizing information stored in the storage unit 304.

In step S503, the customizing unit 305 generates printing setting information of the default value based on the customizing information obtained. Here, for the setting item not included in the customizing information, the customizing unit 305 sets a value hard-coded in the printer driver 104 as a default value. Moreover, the customizing unit 305 includes, in the printing setting information, identifying information included in the customizing information.

In step S504, the customizing unit 305 passes on default printing setting information to the OS 101.

In step S505, the OS 101 saves, in the common storage unit 402, default printing setting information. In this way, the default printing setting information used by the OS 101 may be generated.

Process of Updating Printing Setting Information

Figure 16:
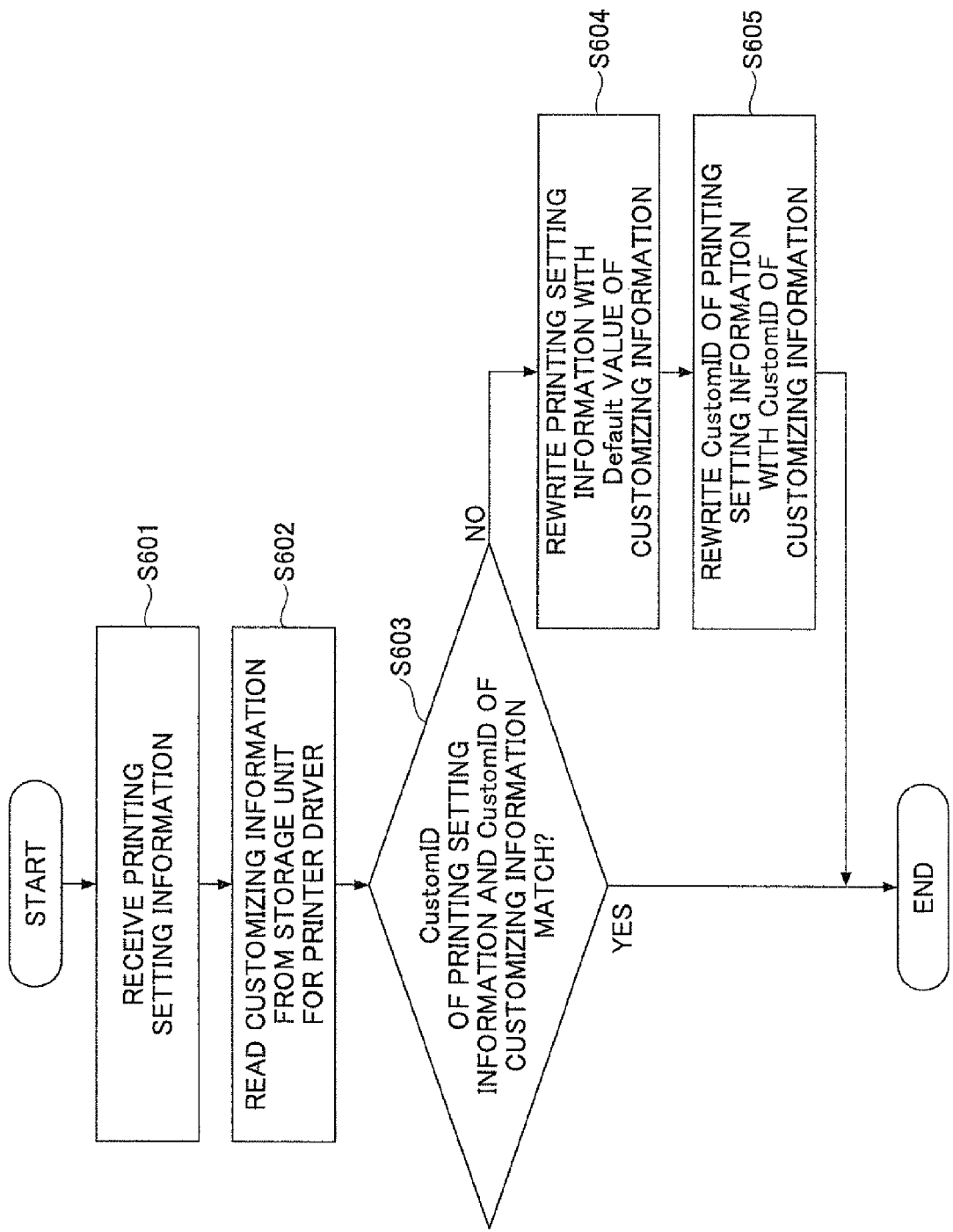
FIG. 16 is a flowchart showing an exemplary process in which the printing setting information is updated.

FIG. 16 is a flowchart showing an exemplary process in which printing setting information is updated. When printing setting information which is generated based on old customizing information and not on new customizing information, the printing setting information is updated with a default value included in the new customizing information.

In step S601, the printer driver 104 obtains printing setting information from the OS 101 and the application 102.

In step S602, the updating unit 303 reads from the storage unit 404 for printer driver and obtain the customizing information.

In step S603, the updating unit 303 determines whether the Custom ID within the printing setting information and the Custom ID within the customizing information match. If the Custom IDs match (step S603-YES), an updating process is completed and if the Custom IDs do not match (step S603-NO), the process proceeds to step S604.

In step S604, the updating unit 303 rewrites a setting value of a corresponding setting item within printing setting information with a default value of the setting item included in the customizing information.

In step S605, the updating unit 303 rewrites the Custom ID within the printing setting information with the Custom ID included in the customizing information.

For example, suppose the printing driver included in the customizing information shown in FIG. 8 is updated to the printer driver included in the customizing information shown in FIG. 9. Then, the printing setting information generated based on the customizing information shown in FIG. 9 is to be input to the updating unit 303 by the OS 101 and the application 102.

The customizing information at this time is as shown in FIG. 9, so that, with the updating unit 303, the color setting is changed to black and white and the screen setting is changed to opentop. The Custom ID included in the updated printing setting information is changed to the Custom ID (custom 2) of the customizing information shown in FIG. 9. Thus, unless the printer driver 104 is updated, the default setting value is not changed by the updating unit 303 even when the printing setting information is input into the updating unit 303.

Process when Opening the Printing Setting Screen by the OS

Figure 17:
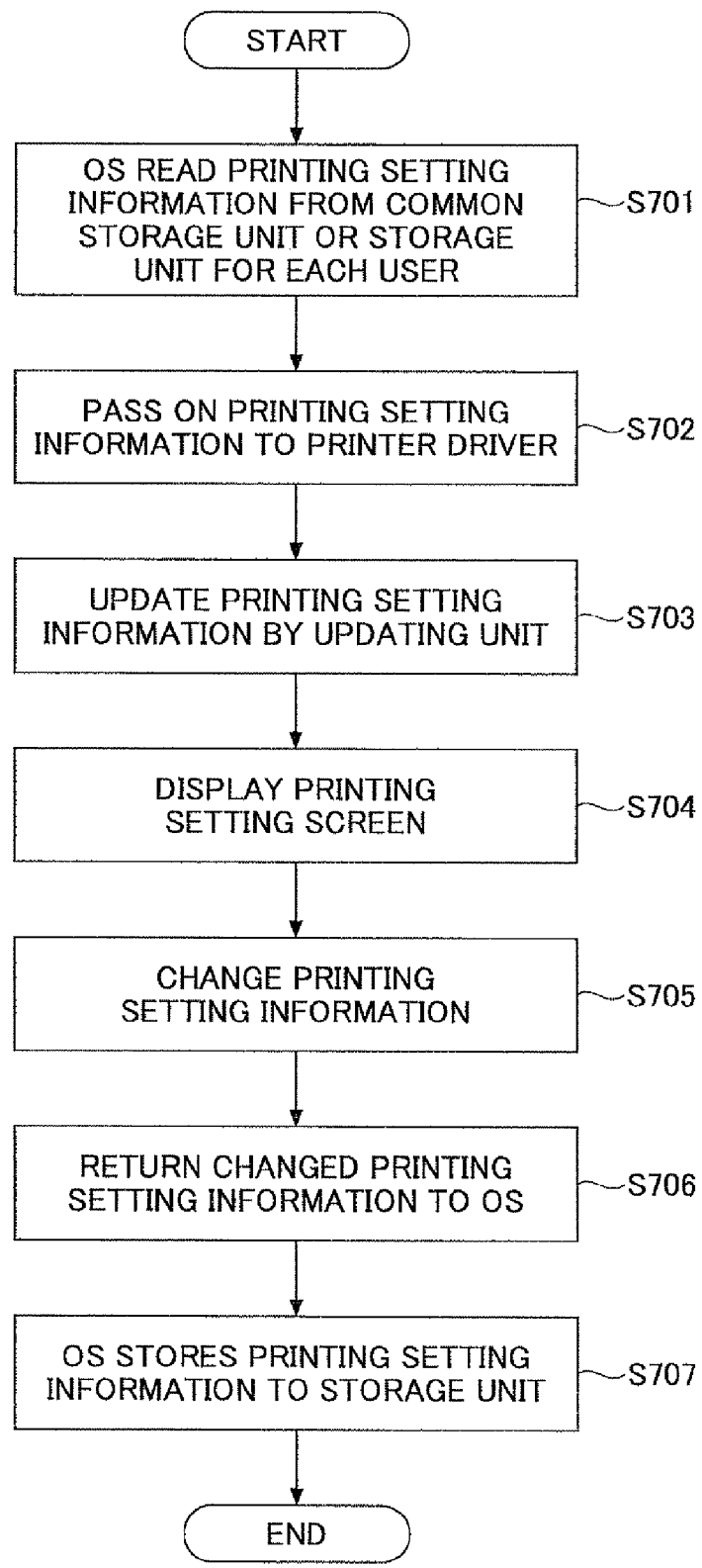
FIG. 17 is a flowchart showing an example of a process when the OS opens a printing setting screen and causes a user to change printing setting information.

FIG. 17 is a flowchart showing an example of a process when the OS 101 opens a printing setting screen and causes a user to change a printing setting. For example, there is a process when opening a printing setting screen from a printer folder.

In step S701, the OS 101 reads from the common storage unit 402 or the storage unit 403 for each user and obtains the printing setting information. An administrator may read the printing setting information from either of the common storage unit 402 and the storage unit 403 for each user, while a general user may read the printing setting information from the storage unit 403 for each user. Whether it is the administrator or the general user may be determined with a log-in name or a log-in ID.

In step S702, the OS 101 outputs printing setting information to the printer driver 104.

In step S703, if there is a need for updating, the updating unit 303 updates printing setting information input. The updating process by the updating unit 303 is a process shown in FIG. 16.

In step S704, the screen display unit 301 performs a display control of the printing setting screen based on the updated printing setting information.

In step S705, the printer driver 104 accepts a change of the printing setting information by the user from the printing setting screen.

In step S706, the printer driver 104 returns the changed printing setting information to the OS 101.

In step S707, the OS 101 stores the printing setting information in the common storage unit 402 or the storage unit 403 for each user.

In this way, when the OS 101 requests for displaying the printing setting screen, the printing setting information based on the most recent customizing information may be reflected into the printing setting information held by the OS 101.

Process when Opening the Printing Setting Screen by the Application

Figure 18:
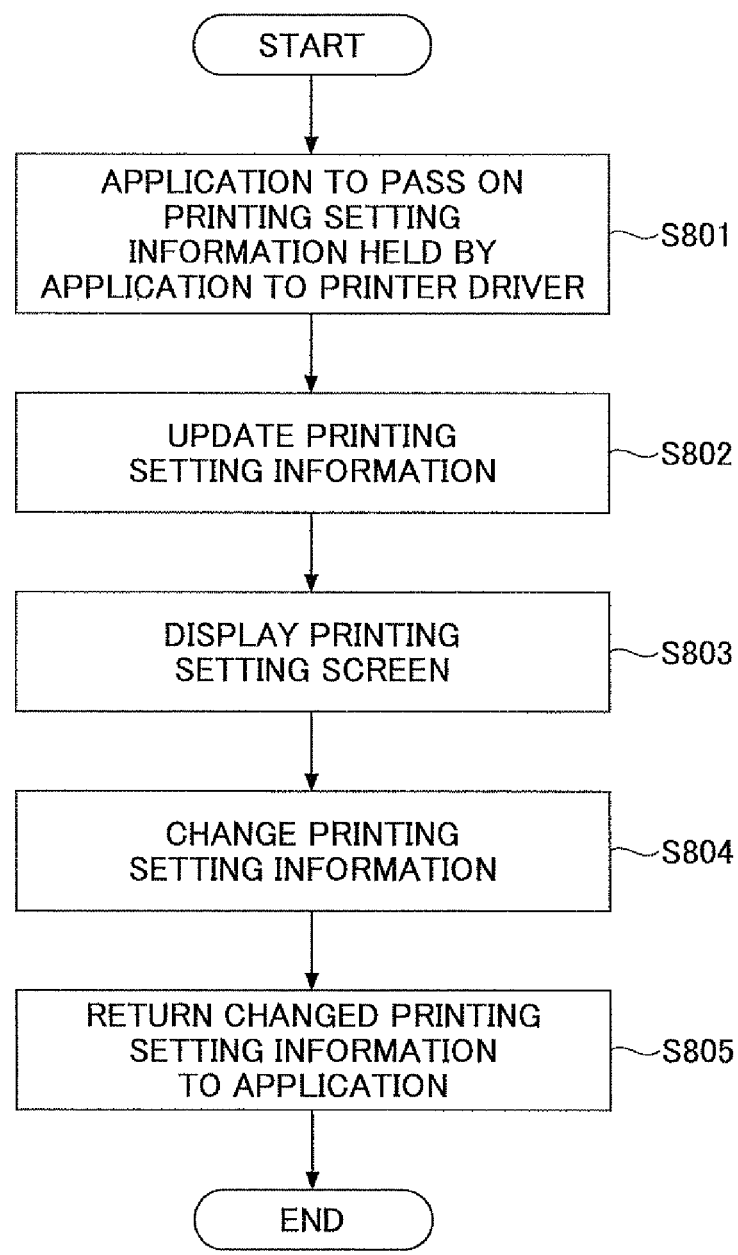
FIG. 18 is a flowchart showing an example of a process when an application opens the printing setting screen and causes the user to change the printing setting information.

FIG. 18 is a flowchart showing an example of a process when an application opens the printing setting screen and causes the user to change the printing setting information. The process shown in FIG. 18 is a process when opening a printing setting screen from the application 102, for example.

In step S801, the application 102 outputs the printing setting information held by itself to the printer driver 104.

In step S802, if required, the updating unit 303 updates the printing setting information input. The updating process is a process shown in FIG. 16.

In step S803, the screen display unit 301 performs a display control of the printing setting screen based on the updated printing setting information.

In step S804, the printer driver 104 accepts a change of the printing setting information by the user from the printing setting screen.

In step S805, the printer driver 104 returns the changed printing setting information to the application 102. In this way, when the application 102 requests for displaying the printing setting screen, the printing setting information based on the most recent customizing information may be reflected into the printing setting information held by the application 102.

Process of Outputting Printing Setting Information by the Printer Driver

Figure 19:
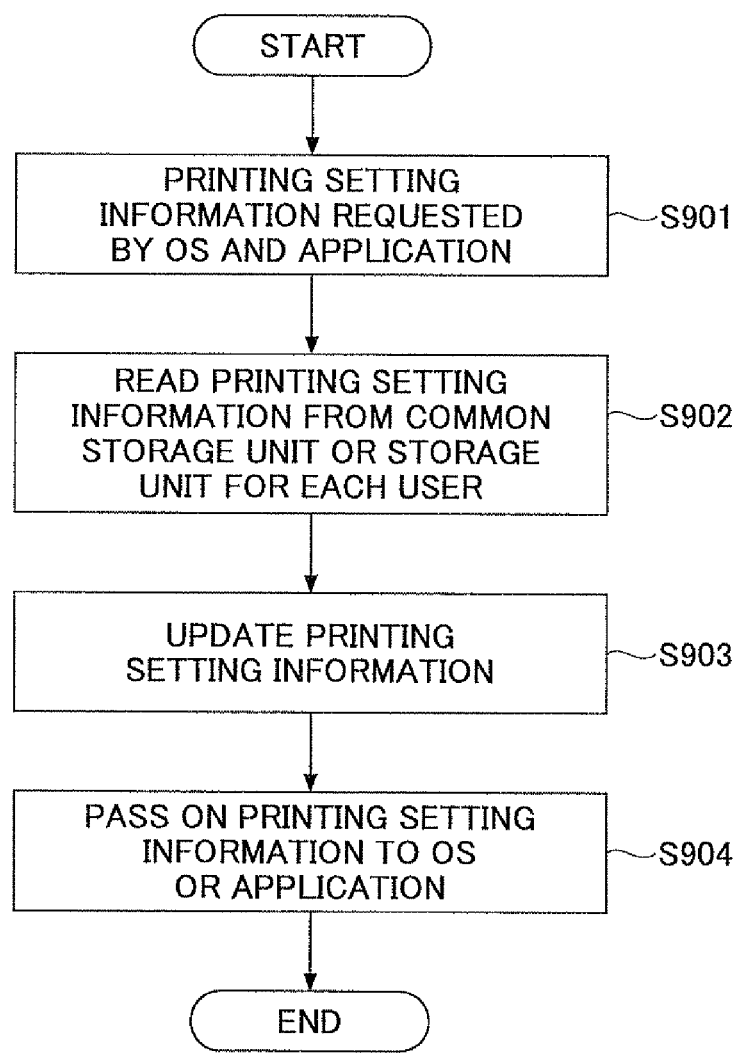
FIG. 19 is a flowchart showing an example of a process in which the printer driver outputs the printing setting information stored in a storage unit.

FIG. 19 is a flowchart showing an example of a process in which the printer driver 104 outputs the printing setting information stored in the storage unit 103. This process is a process executed when requested by the OS 101 or the application 102. Moreover, the OS 101 or the application 102 requests this process at an arbitrary timing.

In step S901, the printer driver 104 is requested for the printing setting information by the OS 101 or the application 102.

In step S902, the updating unit 303 reads from the common storage unit 402 or the storage unit 403 for each user and obtains the printing setting information.

In step S903, if required, the updating unit 303 updates the printing setting information input. The updating process is a process shown in FIG. 16.

In step S904, the printer driver 104 passes the updated printing setting information to the OS 101 or the application 102.

Process at a Time of Printing

FIG. 20 is a flowchart showing an exemplary process at a time of printing. In step S1001 shown in FIG. 20, the application 102 passes on the printing setting information to the printer driver 104.

In step S1002, if required, the updating unit 303 updates printing setting information input. The updating process is a process shown in FIG. 16.

In step S1003, the application 102 passes on the data to be printed to the printer driver 104.

In step S1004, according to the printing setting information updated, the drawing unit 302 converts data to be printed into printing data.

In step S1005, the communication unit 105 outputs the converted printing data to the printer 20. In this way, even when printing based on the printing setting information held by the application 102, the printing setting information based on the most recent customizing information may be reflected to execute printing.

The embodiment 1 as described above makes it possible to customize a default value of printing setting information at the time of updating a printer driver and to reflect the customized default value to the printing setting information held by an OS and an application.

Embodiment 2

Next, an information processing apparatus in embodiment 2 is described. In embodiment 2, it is described that the server PC 10, which is described in embodiment 1, may be applied for an information processing apparatus in a stand-alone environment.

Hardware and Configuration

Hardware and configuration of the information processing apparatus in embodiment 2 is the same as the configuration shown in FIG. 3 and the hardware shown in FIG. 2 of the server PC 10 in embodiment 1.

Operation

In embodiment 2, the processes shown in FIGS. 12 and 14, which are described in embodiment 1, are not necessary. Moreover, where installation is made in FIG. 11 and where updating installation is made in FIG. 13 are set to be a standalone information processing apparatus for applying to a standalone environment.

An embodiment 2 as described above makes it possible to customize a default value of printing setting information at a time of updating a printer driver and to reflect the customized default value to the printing setting information held by an OS and an application even with an information processing apparatus in a standalone environment.

Variations

A program to be executed with an information processing apparatus of each embodiment is recorded and provided in a computer-readable recording medium such as a CD-ROM, a flexible disk (FD), a CD-R, a DVD (Digital Versatile Disk), etc., in a file of an installable or an executable format.

Moreover, a program to be executed by an information processing apparatus of each embodiment may be arranged to be stored on a computer connected to a network such as the Internet, etc., and provided by downloading via the network. Furthermore, the program to be executed by the information processing apparatus of each embodiment may be arranged to be provided or distributed via the network such as the Internet, etc.

Moreover, the program to be executed by the information processing apparatus of each embodiment may be arranged to be embedded in advance and provided in a ROM, etc.

The program to be executed in the information processing apparatus of each embodiment is configured to be modular, including the respective units described above. As actual hardware, the control unit 11 (a processor) reads a program from the auxiliary storage unit 13 to execute the read program, so that each of one or more units out of the-above described units is loaded onto the main storage unit 12 and each of one or more units is generated on the main storage unit 12.

The present invention is not limited to the above-described embodiments themselves, so that elements thereof may be varied to be embodied without departing from the spirit thereof in an embodying stage. Moreover, various inventions may be formed by an appropriate combination of multiple elements disclosed in the above-described embodiments. For example, some elements may be deleted from all elements shown in the embodiments.

The present application is based on Japanese Priority Application No. 2011-200838 filed on Sep. 14, 2011, the entire contents of which are hereby incorporated by reference.

The invention claimed is:

1. An information processing apparatus, comprising:
a control unit configured to execute an operating system (OS) and configured to display a printing setting screen for changing printing setting information based on a request for displaying a printing setting screen from a user, the printing setting information being default information;
a first storage unit which stores the printing setting information used in the OS, the printing setting information including identifying information and a setting value of each setting item in printing;
a second storage unit which stores customizing information including identifying information and a default value defined by the customizing information of a setting item that is included in a printer driver of the information processing apparatus;
a determination unit configured to compare the identifying information included in the customizing information with the identifying information within the printing setting information of the OS to determine whether the identifying information of the printing setting information of the OS and the identifying information of the customizing information in the second storage unit match; and an updating unit which updates the setting value of the printing setting information of the OS to the default value defined by the customizing information, displays the printing setting screen based on the printing setting information stored in the first storage unit and updates the identifying information of the printing setting information to the identifying information of the customizing information when the determination unit determines there is no match, the OS is configured to store the updated printing setting information in the first storage unit.

2. The information processing apparatus as claimed in claim 1, further comprising an application which holds the printing setting information, wherein, when a first identifying information included in the printing setting information and a second identifying information stored in the second storage unit differ when the printing setting information is obtained from the application, the updating unit updates the setting value of the printing setting information to the default value and the identifying information of the printing setting information to the identifying information of the customizing information, and returns the updated printing setting information to the application.

3. The information processing apparatus as claimed in claim 1, further comprising a customizing unit which generates a default setting value of each setting item based on the default value included in the customizing information and outputs, to the OS, printing setting information generated with the identifying information included in the customizing information and the setting value generated, wherein the first storage unit stores printing setting information generated by the customizing unit.

4. The information processing apparatus as claimed in claim 1, wherein the first storage unit includes a third storage unit which stores default printing setting information and a fourth storage unit which stores printing setting information for each user.

5. The information processing apparatus as claimed in claim 1, wherein customizing information includes a custom identifier which identifies customizing contents and a default item in a setting item which is included in printing setting information, which is customizing contents.

6. The information processing apparatus as claimed in claim 1, wherein the identifying information in the first storage unit is information identifying the printing setting.

7. The information processing apparatus as claimed in claim 1, wherein the identifying information in the second storage unit is information identifying the customizing information.

8. The information processing apparatus as claimed in claim 1, wherein the request is made from a printer folder.

9. A non-transitory computer-readable recording medium having recorded thereon a program which causes a computer to execute:

a controlling step to execute an operating system (OS) and to display a screen for changing printing setting information based on a request from a user, the printing setting information being default information;

a first obtaining step, by the OS, which obtains the printing setting information from a first storage unit which stores the printing setting information including identifying information and a setting value of each setting item in printing;

a second obtaining step which obtains customizing information from a second storage unit which stores the customizing information including identifying information and a default value defined by the customizing information of a setting item that is included in a printer driver;

a determining step to compare the identifying information included in the customizing information with the identifying information within the printing setting information of the OS to determine whether the identifying information of the printing setting information of the OS and the identifying information of the customizing information in the second storage unit match; and an updating step which updates the setting value of the printing setting information of the OS to the default value defined by the customizing information and updates the identifying information of the printing setting information to the identifying information of the customizing information when the determining step determines there is no match, the OS is configured to store the updated printing setting information in the first storage unit.

10. A method, comprising the steps of:

a controlling step to execute an operating system (OS) and to display a screen for changing printing setting information to be used in the OS based on a request from a user, the printing setting information being default information;

a first storage step which stores, in a first storage unit, the printing setting information used in the OS, the printing setting information including identifying information and a setting value of each setting item in printing;

a second storage step which stores, in a second storage unit, customizing information including identifying information and a default value defined by the customizing information of a setting item that is included in a printer driver;

a determining step to compare the identifying information included in the customizing information with the identifying information within the printing setting information of the OS to determine whether the identifying information of the printing setting information of the OS and the identifying information of the customizing information in the second storage unit match; and an updating step which updates the setting value of the printing setting information of the OS to the default value defined by the customizing information and the identifying information of the printing setting information to the identifying information of the customizing information when the determining step determines there is no match, the OS is configured to store the updated printing setting information in the first storage unit.

11. The method as claimed in claim 10, further comprising an updating step which, when a first identifying information included in the printing setting information and a second identifying information stored in the second storage unit differ when the printing setting information is obtained from an application which holds the printing setting information, updates the setting value of the printing setting information to the default value and the identifying information of the printing setting information to the identifying information of the customizing information, and returns the updated printing setting information to the application.

12. The method as claimed in claim 10, further comprising a customizing step which generates a default setting value of each setting item based on the default value included in the customizing information and outputs, to the OS, printing setting information generated with the identifying information included in the customizing information and the setting value generated, wherein
    the first storage step stores, in the first storage unit, printing setting information generated by the customizing unit.

13. The method as claimed in claim 10, wherein
    the first storage step includes a third storage step which stores, in a third storage unit, default printing setting information and a fourth storage step which stores, in a fourth storage unit, printing setting information for each user.

\* \* \* \* \*